INVENTOR
PAIGE DRAKE L'HOMMEDIEU
BY
Alexander T. Kardos
ATTORNEY

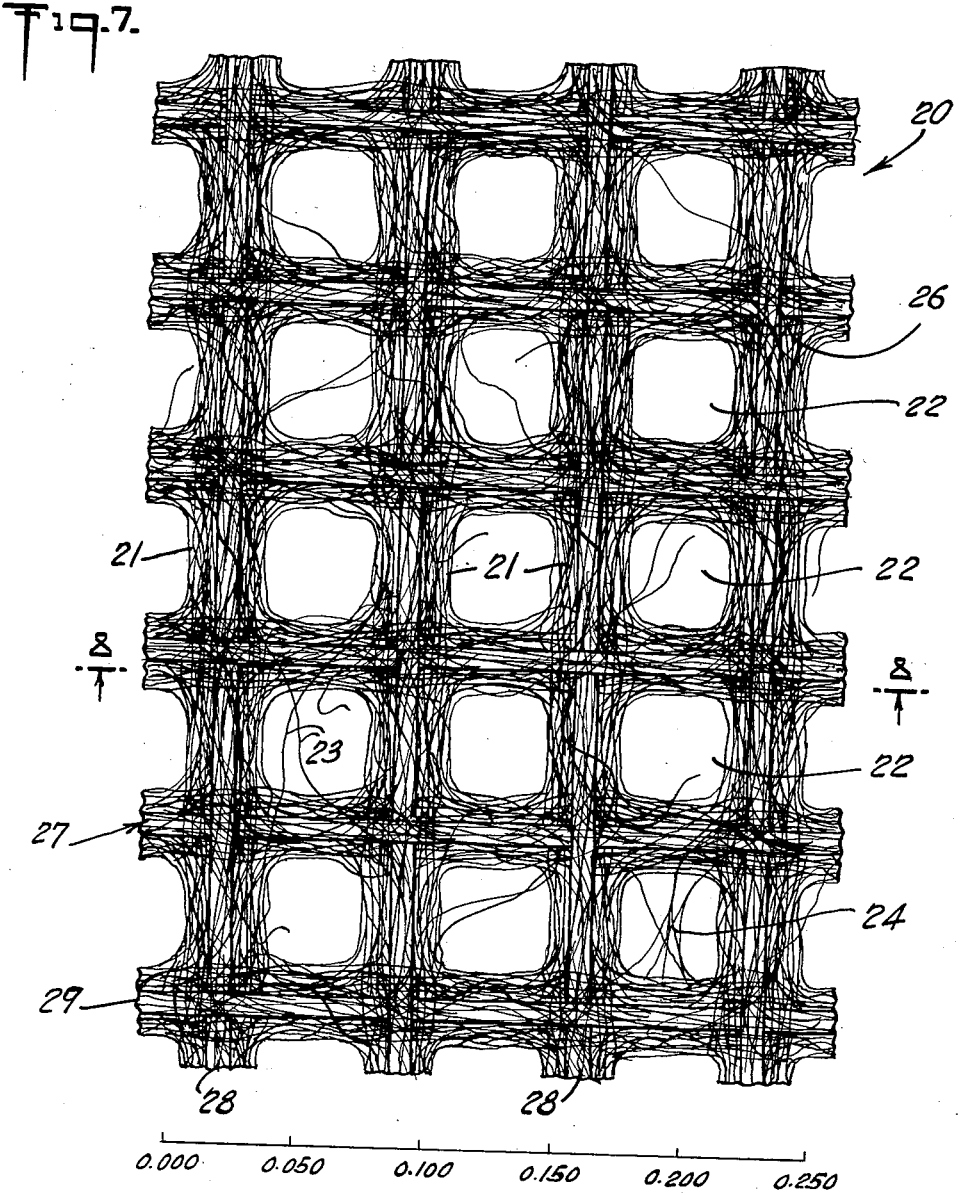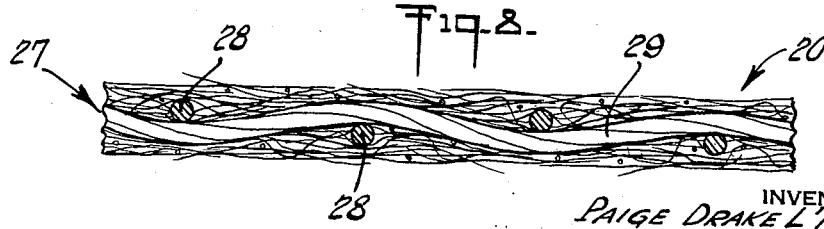

INVENTOR
PAIGE DRAKE L'HOMMEDIEU
BY
Alexander T. Kardos
ATTORNEY

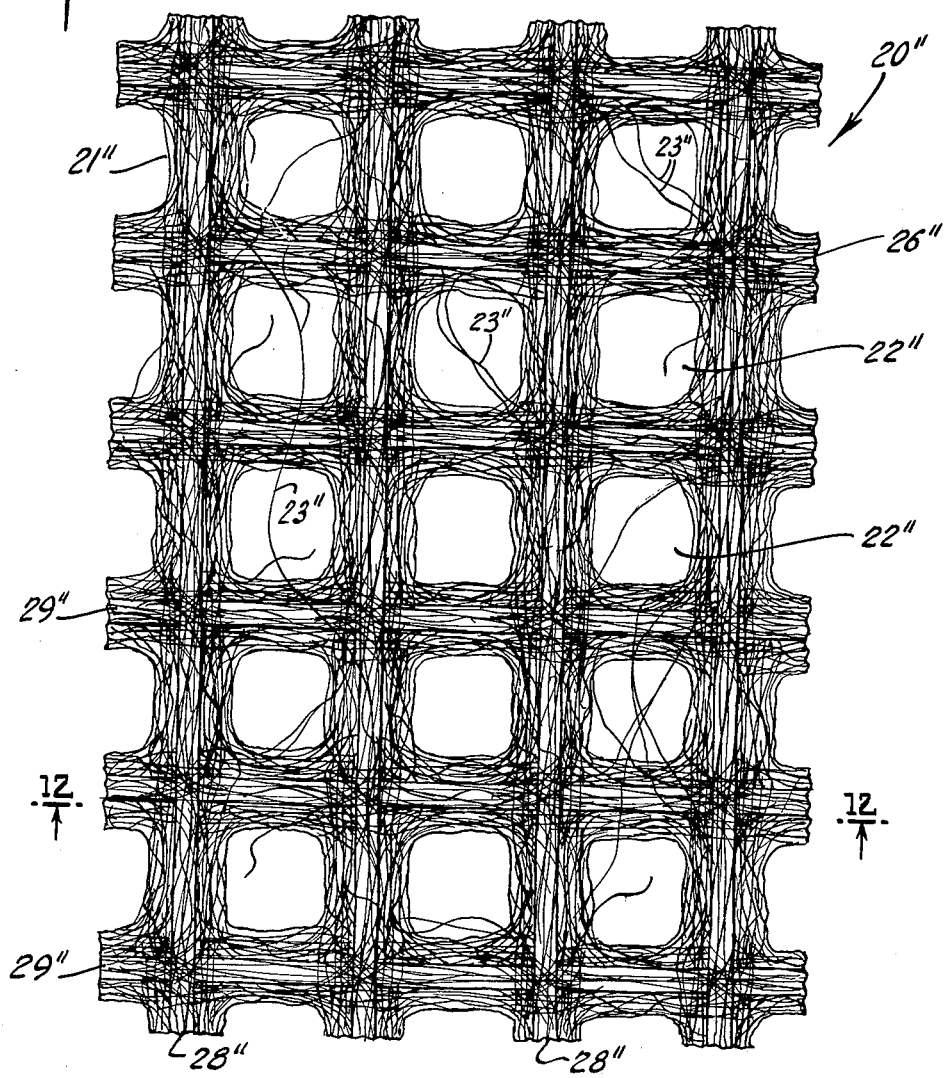
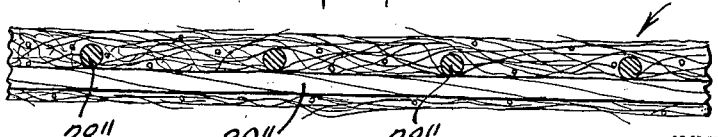

United States Patent Office 3,129,466
Patented Apr. 21, 1964

3,129,466
REINFORCED NONWOVEN FABRICS AND METHODS AND APPARATUS OF MAKING THE SAME
Paige Drake L'Hommedieu, New Brunswick, N.J., assignor, by mesne assignments, to Johnson & Johnson, New Brunswick, N.J., a corporation of New Jersey
Filed Sept. 19, 1958, Ser. No. 762,070
5 Claims. (Cl. 19—145)

The present invention relates to reinforced nonwoven fabrics and to methods and apparatus for making the same.

More particularly, the present invention is concerned with reinforced nonwoven fabrics comprising a nonwoven fibrous material having the general appearance of a woven material, reinforced with a fabricated material containing textile strands or yarns, embedded in the nonwoven fibrous material. In the fabric of the invention the fibers of the nonwoven material surround, and are intertwined and intermeshed with each other and with the textile strands or yarns of the reinforcing fabricated material so as to form a coherent, reinforced nonwoven fabric. And it is also particularly concerned with methods and apparatus for intertwining and intermeshing the fibers of a nonwoven fibrous web with the textile strands or yarns of a reinforcing fabricated material, to form the reinforced nonwoven fabric of the invention.

Fabricated textile materials such as woven and knitted fabrics have been used for countless years. In those uses wherein the fabricated textile materials contact or rub against the more sensitive parts of the human body, a soft and gentle hand has been very desirable. However, in many instances, the surface properties and characteristics of these fabricated textile materials have not been as soft and as gentle as could be desired, particularly in the case of fabrics containing physically interengaged strands or yarns, such as in gauze or other open-mesh fabrics.

Nonwoven fabrics, on the other hand, have been found to have a soft and gentle hand and have excellent non-irritating surface properties and characteristics. Unfortunately, they do not have the strength, resistance to wear, launderability, and other physical properties of woven and knitted fabrics and consequently have replaced such fabrics only when strength, resistance to wear, launderability, etc., are not essential prerequisites.

It has now been found that a reinforced nonwoven fabric can be made which will satisfactorily combine the desirable properties of the strength, resistance to tear, launderability, etc., of woven and knitted fabrics with the desirable soft and gentle hand of a nonwoven fabric.

Such a reinforced nonwoven fabric may be made by positioning a nonwoven fibrous web, for example a card web or a web of fibers of papermaking length, on one or both sides of a reinforcing fabricated material containing textile strands or yarns, and in contacting relationship therewith, and then passing a fluid through the fibrous web and the reinforcing fabricated material under the rearranging fluid conditions more fully described in copending, commonly-assigned Patent Application Serial No. 567,275, filed February 23, 1956, now Patent No. 2,862,251. Under such conditions, the individual fibers of the fibrous web are rearranged into a plurality of fabric openings defined by groups of fiber segments interconnected at fiber junctures and are simultaneously intertwined and intermeshed with and about the textile strands or yarns of the reinforcing fabricated material to form a coherent, reinforced nonwoven fabric having the above-described desired properties and characteristics.

The nonwoven fibrous web or layer which is processed in accordance with the present invention may be produced by any desired method such as by air deposition techniques, liquid papermaking processes, carding, garnetting, or the like, from short fibers of papermaking length and from longer fibers up to and including those of textile length. In these nonwoven fibrous webs or layers the individual fibers are capable of movement under the influence of applied fluid forces.

The starting nonwoven fibrous web or layer may contain, for example, fibers of various average lengths ranging from as low as about 1 mm. (about 0.040 inch) in the case of wood fibers of poplar, to as high as about 8 mm. (about 0.320 inch) or more in the case of western redwood. Within the more commercial aspects of the present invention, however, wood fibers having average lengths greater than about 3 mm. (about 0.120 inch) up to about 7 mm. (about 0.280 inch) (spruce, fir, pine, hemlock and larch) are preferred.

Other short length fibers may also be used in the starting web or layer in the application of the present invention. Such other fibers include vegetable fibers such as cotton linters which have an average fiber length of about 4–5 mm., cotton hull shavings fibers which have an average fiber length of about 2–3 mm., mineral fibers such as asbestos, glass, rock wool, etc., or any of the hereinafter-mentioned natural or synthetic fibers, preferably in lengths of less than about 12 mm. (about ½ inch) and down to about 1 mm.

It is preferred that when short papermaking fibers are used they be unbeaten or substantially unhydrated, especially if a textile-like fabric is desired as the end product. In this connection, shorter hydrated fibers of woodpulp in a papermaking length, for instance, may be mixed with longer fibers in such a way that the longer fibers will contribute part of the strength desired in the resulting reinforced nonwoven fabric while the shorter wood fibers will decrease its cost. Good results can also be obtained with a layer of hydrated woodpulp fibers which would introduce elements of a plastic mass into the fibrous sheet.

The term "woodpulp," when used herein in a generic sense, is intended to cover any and all woodpulps, such as mechanical pulp, rag pulp, sulfate (kraft) pulp, semi-chemical pulp, soda pulp, sulfite pulp, straw pulp, pulp from combined processes, and the like.

The starting nonwoven fibrous material may also contain various types of particulate solids, including materials including fibers having potentially adhesive character or capable of providing visual or other sensory interest. If desired, the starting nonwoven fibrous material may also include special fibers, as for example fibers which are capable of curling, bending, stretching, shrinking, or otherwise deforming, after the reinforced nonwoven fabric has been produced. The main requirement for these added individual elements of the starting nonwoven fibrous material is that they also must be capable of movement under the influence of the applied rearranging fluid force. Thus, this invention is not limited to the use of any particular fiber but can take advantage of many properties of different fibers, as well as mixtures of fibers.

The layer of starting nonwoven fibrous material may, if desired, also comprise or consist of, natural vegetable and animal fibers such as cotton, silk, wool, vicuna, mohair, alpaca, flax, ramie, jute, abaca, etc.; synthetic or man-made fibers such as the cellulosic fibers, notably cuprammonium, viscose or regenerated cellulose fibers; cross-linked cellulosic fibers such as "Corval" and "Topel"; cellulose ester fibers such as cellulose acetate ("Celanese") and cellulose tri-acetate ("Arnel"); the saponified cellulose ester fibers such as "Fortisan" and "Fortisan–36"; the polyamide fibers such as nylon 6 (poly-caprolactam), nylon 66 (hexamethylene diamine-adipic acid), nylon 610 (hexamethylene diamine-sebacic acid), nylon 11 (11-amino undecanoic acid—"Rilsan"); protein fibers such as "Vicara"; halogenated hydrocarbon fibers such as "Teflon" (polytetrafluoroethylene); hydrocarbon fibers such as polyethylene, polypropylene and polyisobutylene; polyester fibers such as "Dacron"; vinyl fibers such as "Vinyon" and saran; dinitrile fibers such as "Darvan"; nitrile fibers such as "Zefran"; acrylic fibers such as "Dynel," "Verel," "Orlon," "Acrilan," "Creslan," etc.; mineral fibers such as glass, metal; etc.

When the length of such fibers is less than about 12 mm. (about ½ inch), they are preferably formed into fibrous webs by fluid (liquid or air) deposition techniques and processes. However, when the fibers have lengths greater than about ½ inch and up to about 2½ inches or more, or are in other forms such as rags or waste, other web formation methods such as carding, garnetting, shredding, thrashing, or the like may be used.

The denier of the individual synthetic fibers referred to above is preferably in the range of the approximate thickness of the natural fibers mentioned and consequently deniers in the range of from about 1 to about 3 are preferred. However, where greater opacity or greater covering power is desired, deniers of down to about ¾ or even about ½ may be employed. Where desired, deniers of up to about 5.5, 6, 8, 10, 15, or higher, may be used. The minimum and maximum denier are, of course, dictated by the desires or requirements for producing a particular nonwoven fabric, and by the machines and methods for producing the same.

The weight of the fibrous web or layer of starting material may be varied within relatively wide limits depending upon the requirements of the finished product. A single, thin web of fibers, such as produced by a card, may have a weight of from about 30 to about 150 grains per square yard. Such a thin fibrous web, however, is so fragile that its handling and manipulation is difficult. In the usual case, therefore, from about 3 to about 12 or more of these webs are combined and processed in the combined form. In instances where products having a greater weight are desired, total web weights of as high as about 2600 or 2800 grains or more per square yard may be processed. Within the more commercial aspects of the present invention, however, web weights of from about 150 grains per square yard to about 1750 grains per square yard are contemplated.

Mixtures of short textile fibers and long textile fibers may be employed in the preparation of such fibrous webs and the particular percentages of each type of fiber will vary from 0% to 100% of each fiber, depending upon the method of formation selected for preparing the fibrous web, the nature of the fabricated material used as reinforcing, the ultimate use of the reinforced nonwoven fabric, and so forth.

The fabricated material used as reinforcing may be selected from a large group of textile materials containing textile strands or yarns including woven fabrics, notably gauze, crinoline, cheesecloth, marquisette, voile, and other relatively open-mesh fabrics, of a plain, leno, or other weave. Knitted, crochetted, or lace fabrics may be satisfactorily employed. A warp sheet of spaced, substantially parallel threads or yarns may be used. Laminated materials, such as scrim wherein the "warp" and "filling" are not interwoven but are merely adheringly laid on one another, usually at right angles to each other but not necessarily so, may also be used.

Open-mesh or loosely-fabricated textile materials are preferred as the reinforcing materials. The degree of openness will depend upon many factors such as the pattern of the apertured element (drum or belt) of the fiber rearranging means, the porosity desired in the resulting reinforced nonwoven fabric, the required strength and resistance to tear, the launderability, etc. In the case of gauze fabric, for example, various degrees of openness of weave are possible such as 24 x 20, 22 x 18, 20 x 16, 20 x 12, 18 x 18, 18 x 14, 15 x 15, 14 x 14, 14 x 10, 12 x 12, 10 x 10 10 x 8, 8 x 8, etc. Similar openings are also of use in the case of scrim wherein the "warp" and "filling" are not interwoven and in which lower counts such as 6 x 6, 5 x 5, 4 x 4, 3 x 3, etc., are readily possible.

The type of fiber used in fabricating such materials may be selected from a large group of presently known fibers and substantially any one of the previously referred to fibers may be employed.

Although the present invention will be described with greater reference to reinforcing fabricated material made from textile strands and yarns spun from staple fibers, the inventive concept is not to be construed as limited thereto. Other forms of textile strands and yarns including monofilaments and multifilaments may be used. The extreme length of such filaments, as compared to staple fibers, permits their being used without twist or with very low twist and they may be fabricated into yarn without the spinning operations required for fibers.

The fluid which is used to rearrange the fibers in the starting nonwoven material in the method of this invention is preferably water, but it may also contain materials which it is desired to incorporate in the reinforced nonwoven product. For example, the treating liquid may be an aqueous liquor containing a dye or pigment or an adhesive material, a flame-retardant agent, a moth- or mildew-proofing material, a wet-strength agent, an insecticide or germicide, a disinfectant, etc.

If desired, and particularly where the fiber selected is hydrophobic, the water used in the hydraulic rearrangement may be heated to facilitate fiber relaxation and rearrangement. Liquids other than water may also be used, either alone or with the water, to facilitate fiber relaxation or simply to modify the wetting action of the water upon the fibers for the purpose of changing the fiber lubricity to thereby facilitate rearrangement by fluid forces.

In the accompanying drawings and the following specification, I have illustrated and described preferred designs of machines and modes of operation embodying my invention, but it is to be understood that my invention is not to be considered limited to the constructions or operations disclosed except as determined by the scope of the appended claims. In the following drawings:

FIGURE 7 is a fragmentary diagrammatic showing in plan view of a nonwoven fabric incorporating a woven fabric as a reinforcement, made by the apparatus and method of the present invention;

FIGURE 8 is a fragmentary cross-sectional view of the fabric of FIGURE 7, taken on the line 8—8 thereof in the direction indicated;

FIGURE 11 is a diagrammatic showing in a plan view of a nonwoven fabric incorporating a scrim fabric as a reinforcement, made by the apparatus and method of the present invention;

FIGURE 12 is a cross-sectional view of the fabric of FIGURE 11, taken on the line 12—12 thereof in the direction indicated.

Figure 1:
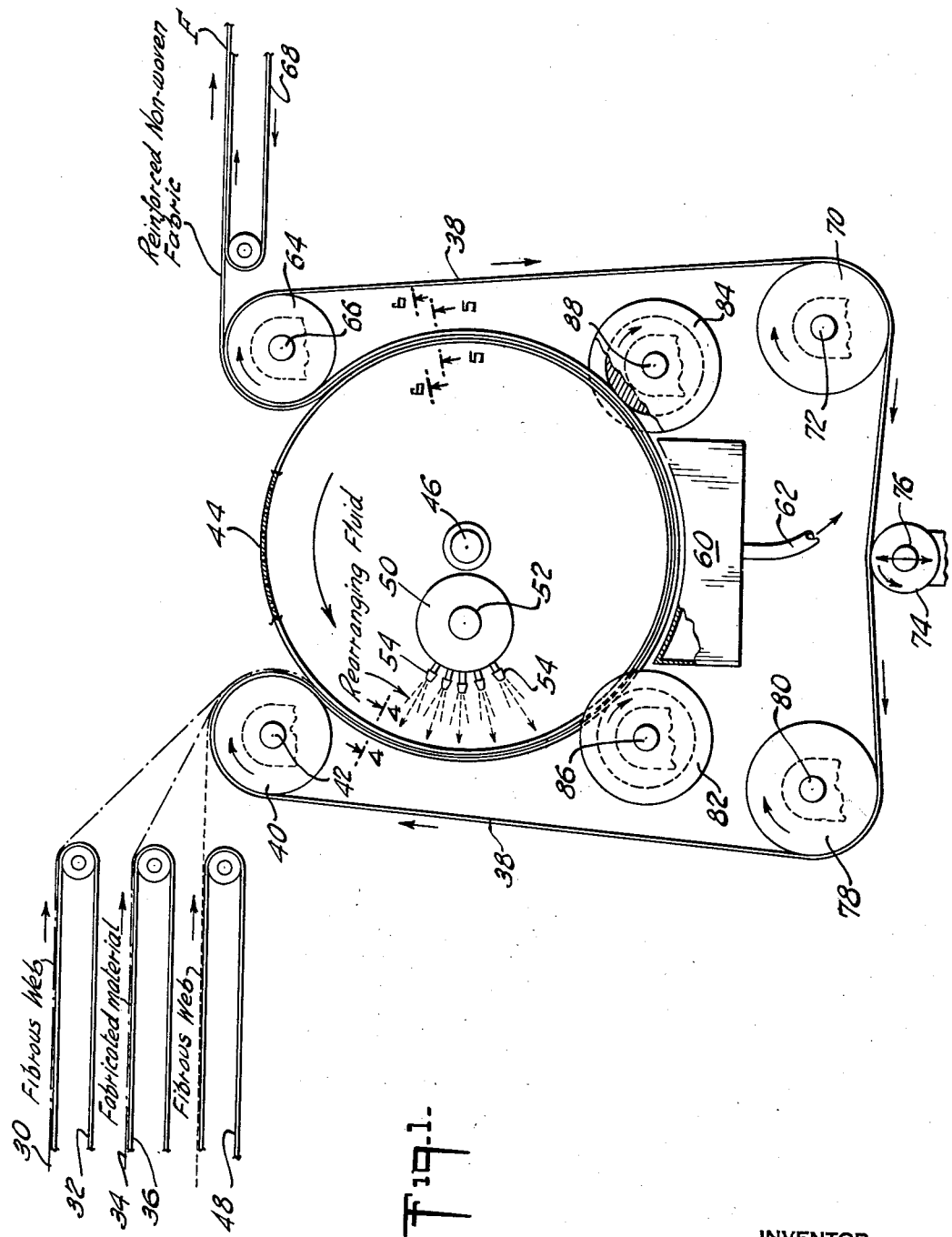
FIGURE 1 is a diagrammatic showing in elevation of a preferred embodiment of fiber rearranging drum-type apparatus suitable for carrying out the method of the present invention.

In the embodiment of the invention shown in the drawings, a typical coherent, reinforced nonwoven fabric 20 is illustrated in FIGURES 7 and 8. This typical reinforced nonwoven fabric comprises elongated interconnected yarn-like bundles or groups 21 of closely associated and substantially parallelized or aligned fiber segments. In this particular embodiment, the bundles or groups 21 of fiber segments are arranged in a definite predetermined pattern forming a nonwoven gauze-like reticular structure wherein interconnected bundles of fiber segments extend at angles of about 90° and 180° to one another.

The individual fibers are quite closely associated in the bundles so that the bundles appear tight and substantially strand-like and cross each other at clearly defined junctures 26 to form relatively discrete and square holes or fabric openings 22 between them, somewhat similar to the interstices in an open-mesh or closely woven fabric.

There are a number of occasional random fibers 23 which lie outside the main fiber bundles 21 and extend in various directions between them. Some of these random fibers 23 may combine to form irregularly-located small bundles 24 which extend between the main bundles 21. The fiber bundles 21 which come together at a given juncture 26 are interconnected by fibers which are common to each of the bundles. These interconnecting fibers are oriented in a plurality of diverse directions generally in the plane of the fabric. In the specific embodiment illustrated, they bend and cross one another at each juncture to form diamond-shaped fiber areas which resemble highway intersections.

A woven gauze fabric 27 comprising warp threads 28 and filling threads 29 is located within the coherent reinforced nonwoven fabric 20 to strengthen the same. It is to be noted (see FIGURE 8) that the fibers of the nonwoven, gauze-like reticular structure in addition to having the configuration of openings, fiber segments and junctures previously described, also are intertwined and intermeshed with the textile threads 28 and 29 of the reinforcing gauze fabric 27 and surround the same. The fibers of the nonwoven fibrous material are outermost on both sides of the gauze fabric 27 and thus give to the reinforced nonwoven fabric a soft and gentle hand along with enhanced absorbency. At the same time, the gauze fabric 27, being innermost, contributes strength, resistance to tear, launderability and other properties of a woven fabric without creating any of the undesirable surface characteristics of a woven fabric.

In FIGURE 1, there is diagrammatically disclosed a preferred embodiment of apparatus suitable for rearranging the fibers of the starting nonwoven fibrous material and simultaneously intertwining and intermeshing the fibers thereof with the textile strands or yarns of a reinforcing fabricated material. In this figure, a nonwoven fibrous web 30 is carried by a movable conveyor belt 32 from a conventional web-forming machine such as a textile card (not shown) and is positioned on a reinforcing fabricated material 34 which is advanced by a conveyor belt 36. In the particular embodiment disclosed, the reinforcing fabricated material 34 is illustrated as a woven gauze fabric comprising warp threads 33 and filling threads 35 (see FIGURES 4–6). Such is, however, illustrative and not limitative of the present invention.

The fibrous web 30 and the fabricated material 34 are deposited on the surface of a movable, endless, foraminous, flexible supporting member 38 such as a carrier made of an open-mesh plastic, for example a woven nylon or a woven wire belt or screen. The foraminous supporting member 38 is trained around a rotatable guide roller 40 rotating on a shaft 42 and carries the fibrous web 30 into contact with the periphery of a rotatable, apertured fiber-rearranging and intermeshing drum 44 rotating on main shaft 46. The openings in member 38 are substantially smaller than the apertures in drum 44 so that the fibers of the nonwoven web are confined in the rearranging space or zone defined by member 38 and drum 44, during the rearrangement thereof about the reinforcing strands of the fabricated material 34.

The fiber-rearranging and intermeshing drum 44 is generally similar in basic principle to the rotatable, apertured, rearranging drum disclosed in the above-mentioned Patent No. 2,862,251.

Adjacent the conveyor belts 32 and 36, there is positioned a third conveyor belt 48 which may be used to carry additional materials, such as a second nonwoven fibrous web into contact with the fabricated material 34. Such an arrangement will initially position a nonwoven fibrous web on both sides of the fabricated material whereby the subsequent rearranging and intermeshing process creates excellent coherence of all layers. The use of this second nonwoven fibrous web is not necessary since in the fiber rearranging process using a single nonwoven fibrous web such as web 30, the fibers are completely rearranged and intermeshed with each other and with the strands or yarns of the reinforcing material 34, all about the strands or yarns, as shown in FIGS. 5, 6, 7 and 8.

The initial contact between the fiber-rearranging and intermeshing drum 44 and the fibrous web 30 and fabricated material 34, is approximately at the 10 o'clock position on the rearranging drum 44, as viewed in FIGURE 1. It is noted that such a contact forms a four-layer sandwich in which the fiber rearranging drum 44 is innermost, the fibrous web 30 is next, the fabricated material 34 is next, and the foraminous supporting member 38 is outermost. This four-layer sandwich is similar to the sandwich illustrated in FIGURE 4 and moves around the periphery of the fiber rearranging drum 44 and it is during selected portions or zones of this peripheral movement that fiber rearrangement and intermeshing takes place substantially simultaneously.

Within the fiber rearranging drum 44 there is positioned a header or a manifold 50 to which a fluid, preferably water, is supplied through a conduit 52, under pressure. Nozzles or jets 54 are provided on one face of the header 50 and the fluid is projected therethrough under pressure at and through the four-layer sandwich as it is moved in a path corresponding to the periphery of the fiber rearranging drum 44. As seen in FIGURE 1, the fluid being sprayed through the nozzles 54 is projected forcibly at and through the sandwich in a zone extending from about 10 o'clock to about 8 o'clock approximately. This zone will be referred to as the fiber rearranging and intermeshing zone and the fluid rearranging principles and operations described in the above-mentioned patent are applicable thereto.

Figure 3:
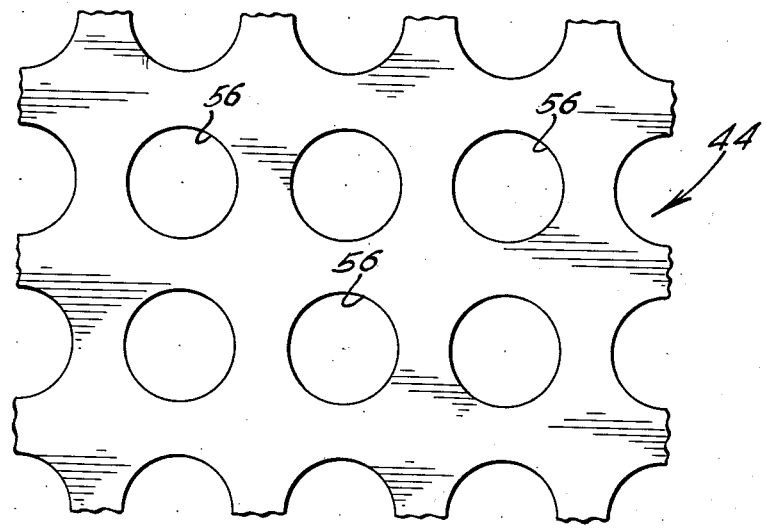
FIGURE 3 is a fragmentary showing in developed plan of an arrangement of the apertures in the surface of the fiber rearranging drum of FIGURE 1, which arrangement is similar to the pattern of the apertures in the surface of the rearranging belt of FIGURE 2.

In FIGURE 3, there is illustrated a fragmentary showing of a preferred arrangement of apertures 56 which may be formed in the periphery of the fiber-rearranging drum 44. Such a showing would be obtained by viewing the drum vertically at approximately the 12 o'clock position in FIGURE 1.

When fluid is projected through the apertures 56 in the fiber rearranging drum against the above-mentioned four-layer sandwich, the fluid passes through the sandwich and then through flexible foraminous member 38, and in doing so bellies foraminous member 38 outwardly to provide the rearranging and intermeshing zone, as described in the aforementioned Patent No. 2,862,251. In this zone the fibers in web 30 are rearranged about the reinforcing strands 33 and 35, and the reinforced nonwoven fabric of the general type illustrated in FIGURE 7 is obtained.

The gauze fabric 34 which is in direct contact with the fibrous web 30 is not materially changed by the fiber rearranging process. However, as noted in FIGURE 8, the fibers of the fibrous web 30 are rearranged and move about so that they intertwine and intermesh with the threads of the gauze fabric 34 and surround the same. Consequently, the finished fabric possesses fibers which are interlocked with the threads of the gauze fabric, whereby smooth and soft faces are presented on both outer surfaces of the gauze fabric 34.

By the time the four-layer sandwich has proceeded past the 8 o'clock position of the fiber rearranging drum 44, fluid rearrangement and intermeshing of the fibers is completed and the reinforced nonwoven fabric is carried onwardly.

A suction or vacuum box 60 is provided adjacent the lower periphery of the fiber rearranging drum 44 in order to facilitate and expedite the removal of the rearranging fluid from the reinforced nonwoven fabric to a desired reduced fluid content. A conduit 62 is provided leading from the vacuum box 60 to a conventional suction device (not shown).

As shown in FIGURE 1, the vacuum box 60 extends from about 7 o'clock to about 5 o'clock on the fiber rearranging drum 44. This position is not essential and, if desired, the vacuum box could be positioned so as to cover a greater, or smaller portion of the periphery of the fiber rearranging drum. Furthermore, if desired a plurality of vacuum boxes may be positioned outside the fiber rearranging drum extending from 8 o'clock all the way around to approximately 1 o'clock.

The de-watered, reinforced nonwoven fabric F proceeds around the periphery of the fiber rearranging drum 44 to the guide roll 64 rotating on a shaft 66 and is then carried by the foraminous supporting member 38 around the guide roll 64 to be positioned on a movable conveyor belt 68 which carries the reinforced nonwoven fabric F onwardly for further processing as desired.

The foraminous supporting member 38 separates from the reinforced nonwoven fabric F at the periphery of guide roll 64 and is led downwardly around guide roll 70 rotating on shaft 72, rearwardly over a vertically adjustable tensioning and tracking guide roll 74 rotating on a shaft 76, and then around a guide roll 78 rotating on a shaft 80 to be returned to guide roll 40 to complete its circuit and to carry additional nonwoven fibrous web starting materials and reinforcing fabricated materials into contact with the fiber-rearranging drum 44. Guide rolls 40, 64, 70 and 78 may be positioned in slidable brackets which are adjustable to assist in the maintenance of the proper tension on the foraminous supporting member 38. This is, of course, in addition to the control and the adjustability exercised by the tensioning and tracking guide roll 74.

Flanged guide wheels 82 and 84 are mounted on rotatable shafts 86 and 88, respectively, and are in rolling, frictional, guiding contact with the fiber rearranging drum 44 to insure its proper rotation. The rearranging drum may be driven by either of the flanged guide wheels 82 or 84, or it may be driven by frictional contact with the foraminous supporting member 38. In the latter case, any one of the guide rolls, such as guide roll 64, for example, is positively driven by conventional power means (not shown) to bring about the desired movement of the foraminous supporting member 38 and the rearranging drum 44.

Figure 2:
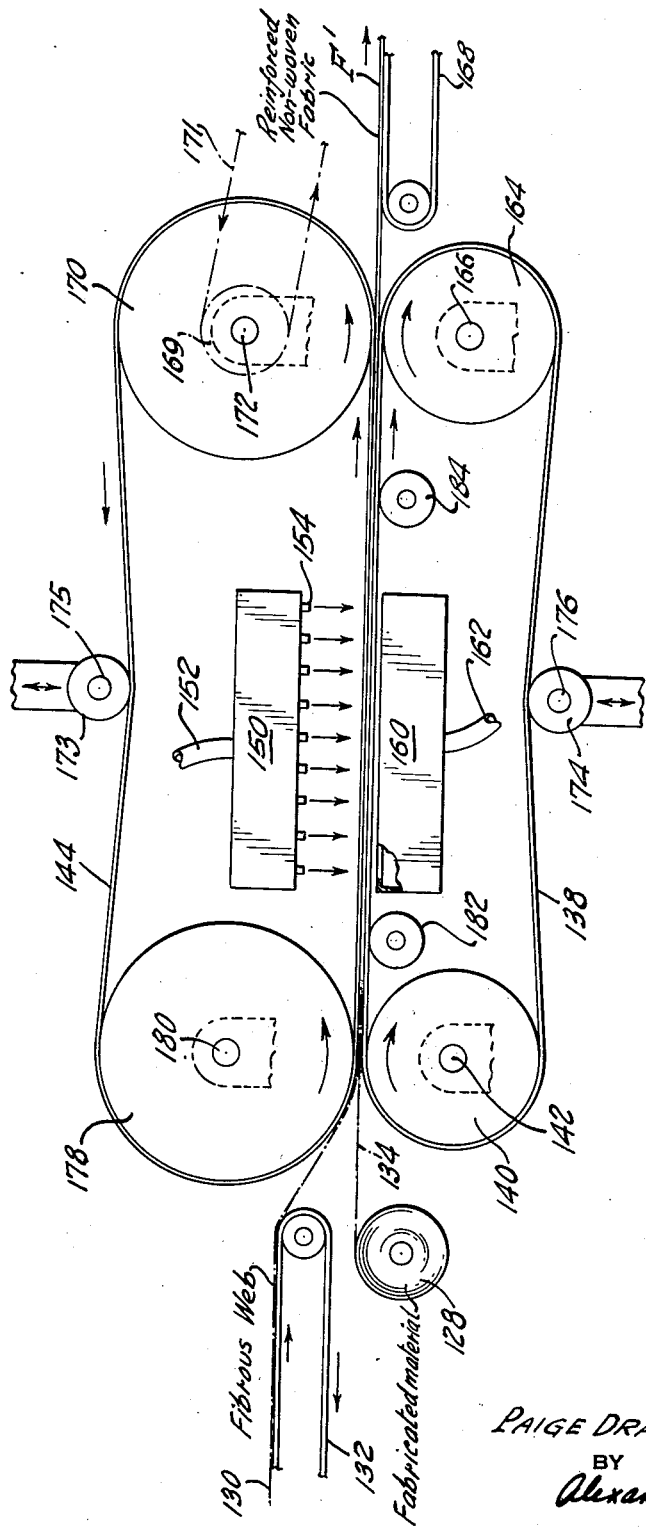
FIGURE 2 is a diagrammatic showing in elevation of a preferred embodiment of fiber rearranging all belt-type apparatus suitable for carrying out the method of the present invention.

In FIGURE 2, there is diagrammatically disclosed another preferred embodiment of apparatus suitable for the rearranging and intermeshing of the fibers of the fibrous web with the threads of the reinforcing fabricated material. In this figure, a fibrous web 130 is carried by a conveyor belt 132 from a fibrous web formation means such as a conventional textile card (not shown) and is deposited on the surface of a movable, endless, foraminous supporting member 138, such as an open-mesh plastic or wire belt or screen, similar to member 38. The foraminous supporting member 138 is trained around a rotatable guide roller 140 rotating on a shaft 142 and brings the fibrous web 130 into contact with a movable, apertured, fiber rearranging belt 144 which is trained around a guide roll 178 rotating on a shaft 180. The guide rolls 140 and 178 are so adjustably positioned that the fibrous web 130 enters the nip between these rolls and substantially simultaneously contacts the endless, foraminous supporting member 138 and the movable, apertured fiber rearranging belt 144. The apertures in belt 144 may have a size comparable to the apertures in drum 44, but in any event are substantially larger than the openings in member 138.

A supply roll 128 of fabricated material 134 containing textile threads, similar to gauze 34, is positioned adjacent the conveyor 132 and supplies the reinforcing fabricated material to the nip of the guide rolls 140 and 178, whereat contact is made with the fibrous web 130.

It is again noted that such an arrangement forms a four-layer sandwich in which the movable rearranging belt 144 is uppermost, the fibrous web 130 is next, the fabricated reinforcing material 134 is next and the foraminous supporting member 138 is lowermost. This four-layer sandwich moves forwardly or to the right, as viewed in FIGURE 2, and it is during a selected portion of this movement that fiber rearrangement and intermeshing takes place substantially simultaneously.

Within the rearranging belt 144, there is positioned a header or a manifold 150 to which a fluid, preferably water, is supplied through a conduit 152 under pressure. Nozzles or jets 154 are provided on the lower face of the header 150 and the fluid is projected therethrough under pressure at and through the four-layer sandwich as it is moved in a path corresponding to the surface of the foraminous supporting member 138. This space below the header 150 will be referred to as the fiber rearranging and intermeshing zone and the fluid rearranging principles and operations are applicable therein.

The apertures in the rearranging belt 144 are very similar in arrangement, configuration and size to the apertures formed in the peripheral surface of the rearranging drum 44 previously described. Reference is made to FIGURE 3 which shows a preferred embodiment of apertures similar to those in the rearranging belt 144.

As in the case of the machine of FIG. 1, when the fluid is projected through the rearranging apertures in the rearranging belt 144, with the above-mentioned four-layer sandwich in the fiber rearranging zone, a rearranged reinforced nonwoven fabric of the general type illustrated in FIGURE 7 will be obtained.

A suction or vacuum assist in the form of a vacuum box 160 is positioned directly below the upper reach of the foraminous supporting member 138 and in alignment with the fluid manifold in order to expedite and facilitate the passage of the rearranging fluid through the sandwich. A conduit 162 is provided and leads to a conventional suction means (not shown) in order to withdraw air and fluid collected in the suction box 160.

A rearranged, reinforced nonwoven fabric F' is thus formed and continues on the surface of the foraminous supporting member 138 to the guide roll 164 rotating on a shaft 166. As the reinforced nonwoven fabric F' leaves the periphery of guide roll 164, it is transferred to a conveyor belt 168 which carries it onwardly for further processing, as desired.

The rearranging belt 144 is trained around a guide roll 170 rotating on a shaft 172 and is directed rearwardly, or to the left as shown in FIGURE 2, and passes a tensioning or tracking guide roll 173 rotating on a shaft 175 and is returned to contact guide roll 178 to complete its circuit.

The foraminous supporting member 138 is trained downwardly and rearwardly around guide roll 164 and moves to the left, as viewed in FIGURE 2, and passes over a vertically adjustable tensioning and tracking guide roll 174 rotating on a shaft 176 to be returned to guide roll 140 to complete its circuit. Supporting rolls 182 and 184 are provided in order to assist in maintaining the upper reach of the foraminous supporting member 138 and the sandwich in a level, horizontal configuration.

The rearranging belt 144 and the foraminous supporting member 138 may be driven at the same speed in any desired fashion. One means to accomplish this driving action is shown in FIGURE 2 and comprises a driving belt 171 which is trained around a pulley 169 mounted on shaft 172 whereby the guide roll 170 is positively driven. The driving belt 171 is driven from a conventional source of power (not shown).

Figure 4:
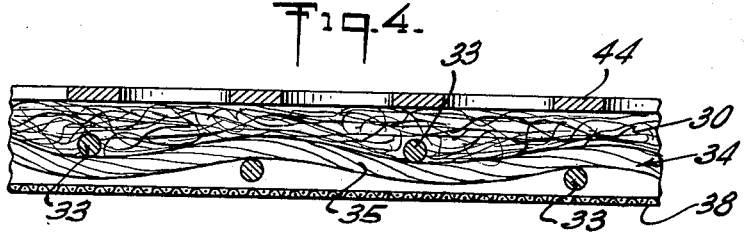
FIGURE 4 is a fragmentary cross-sectional view of the apertured rearranging drum and the foraminous supporting member of FIGURE 1, taken on the line 4—4 thereof in the direction indicated.

FIGURE 4 illustrates in cross section the four-layer sandwich immediately prior to fiber rearrangement and intermeshing. It is to be noted that the rearranging drum 44 is uppermost, the fibrous web 30 is substantially intact and rests on the reinforcing fabricated material 34 which, in FIGURE 4, is a gauze fabric containing warp threads 33 and filling threads 35. Lowermost is, of course, the endless, foraminous supporting member 38.

Figure 5:
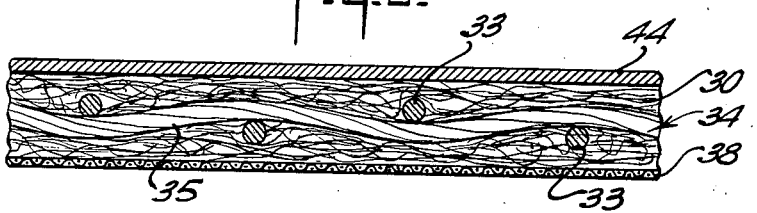
FIGURE 5 is a fragmentary cross-sectional view of the apertured rearranging drum and the foraminous supporting member of FIGURE 1, taken on the line 5—5 thereof in the direction indicated, said line 5—5 passing midway between the centers of the apertures in the rearranging drum.

FIGURE 5 illustrates the four-layer sandwich immediately subsequent to the rearranging and intermeshing step. This particular view is taken on a line passing midway between the centers of the apertures in the rearranging drum 44 and illustrates the fact that the individual fibers of the fibrous web 30 have been rearranged and now are intertwined and intermeshed with the strands 33, 35 of the gauze fabric 34, and surround the same.

Figure 6:
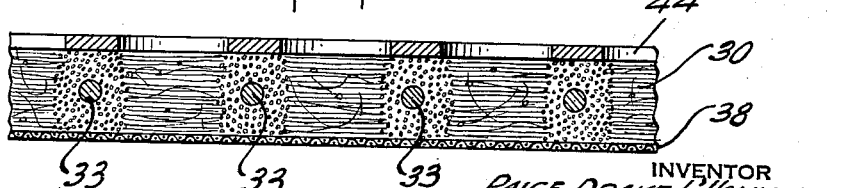
FIGURE 6 is a fragmentary cross-sectional view of the rearranging drum and the foraminous supporting member of FIGURE 1, taken on the line 6—6 thereof in the direction indicated, said line 6—6 passing through the centers of the apertures of the rearranging drum.

FIGURE 6 also illustrates the reinforced nonwoven fabric subsequent to the rearranging and intermeshing step, but it is to be noted that this cross-sectional view is taken on a line passing through the centers of the apertures of the rearranging drum 44. The warp strands 33 of the reinforcing gauze material 34 are clearly shown as well as the rearranged, intermeshing and intertwining configuration of the fibers of the fibrous web 30 with and about the gauze threads.

FIGURE 7 illustrates a typical reinforced nonwoven fabric in which the original nonwoven fibrous web, in rearranged nonwoven form simulating a woven material, is reinforced by a woven gauze fabric. In this reinforced nonwoven fabric, the openings in the gauze and the openings in the rearranged fibrous web are in registry. This, of course, is possible only when the spacing of the gauze openings is identical to a geometric multiple of the spacing of the apertures in the rearranging drum or belt. FIGURE 8 is a cross-sectional view of FIGURE 7 and primarily illustrates the positioning of the rearranged fibers of the starting nonwoven fibrous web on both sides of the reinforcing gauze fabric and about the individual strands thereof.

Figure 9:
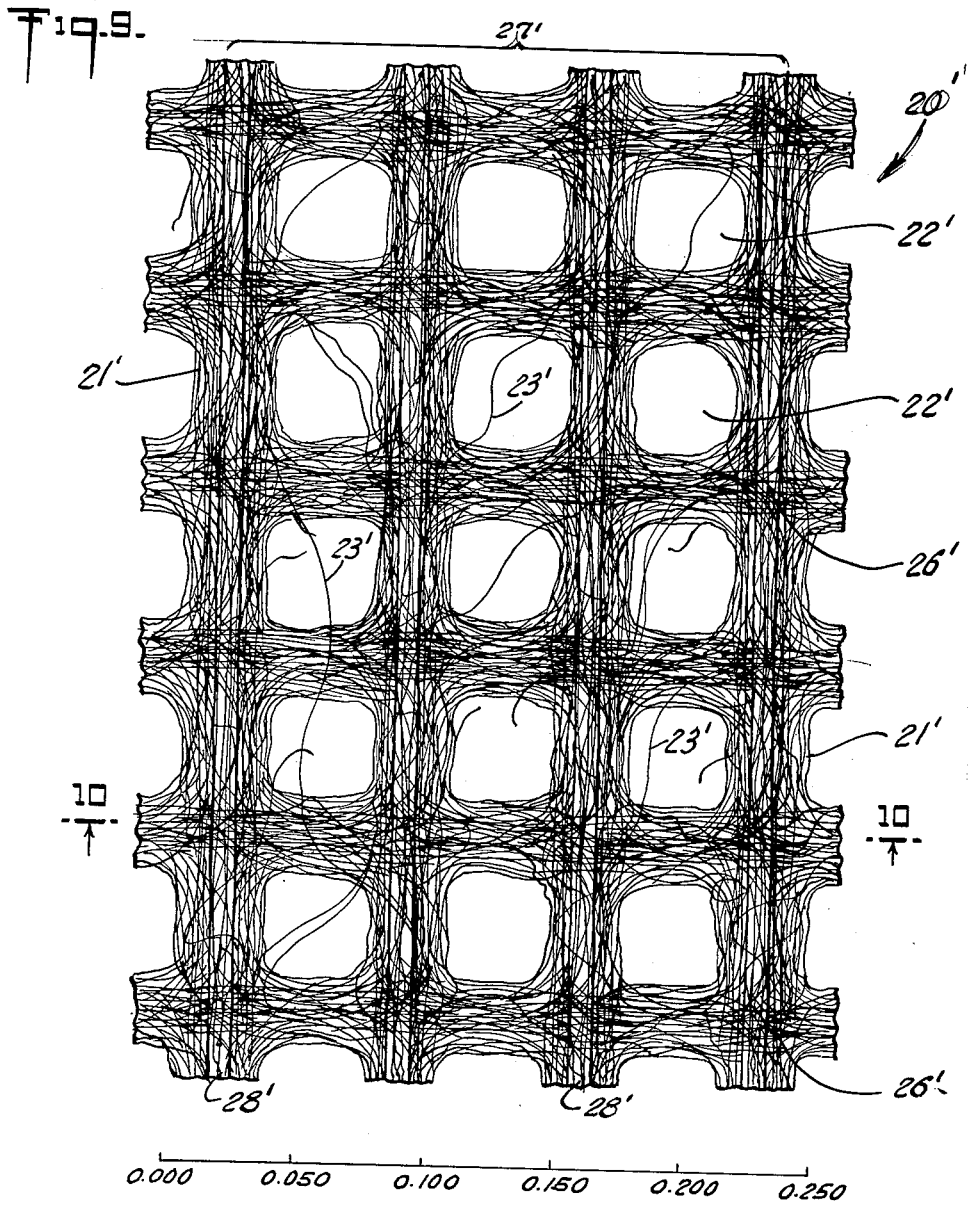
FIGURE 9 is a fragmentary diagrammatic showing in a plan view of a nonwoven fabric incorporating a warp sheet of parallel yarns as a reinforcement, made by the apparatus and method of the present invention.
Figure 10:
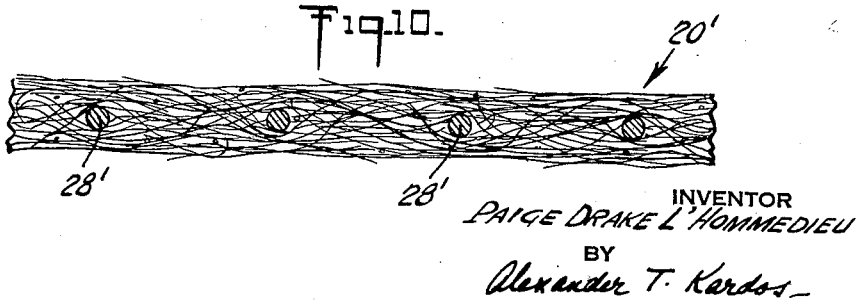
FIGURE 10 is a fragmentary cross-sectional view of the fabric of FIGURE 9, taken on the line 10—10 thereof in the direction indicated.

FIGURE 9 illustrates a reinforced nonwoven fabric 20' of rearranged fibers simulating a woven fabric, comprising yarn-like bundles of fiber segments 21', fabric openings 22', fiber junctures 26', occasional random fibers 23', etc., wherein the fibrous web is reinforced by a warp sheet 27', the spacing of which is such that the warp threads 28' lie in registry with the fibrous portions of the rearranged nonwoven fabric. Again, such registry is possible only by coordinating the spacing of the individual warp threads and the spacing of the apertures in the fiber rearranging drum and belt, so that the proper relationship of the nonwoven starting material and the individual warp threads is maintained in the rearranging zone. Such a reinforced nonwoven fabric possesses far greater strength in the long or machine direction due to the presence of the warp threads. Should the opposite effect be desired, namely, greater strength in the cross direction, such is accomplished by feeding into the rearranging zone a sandwich consisting of a web of nonwoven fibers and filling threads which extend across the width of the nonwoven web. FIGURE 10 is a cross section of the fabric disclosed in FIGURE 9 and primarily illustrates that the fibrous web is intermeshed and intertwined with, and surrounds, the warp threads into a coherent reinforced nonwoven fabric.

FIGURE 11 illustrates a reinforced nonwoven fabric 20" of rearranged fibers simulating a woven fabric, comprising yarn-like bundles 21", fabric openings 22", fiber junctures 26", occasional random fibers 23", etc., wherein the fibrous web is reinforced by a fabricated scrim material 27". As shown, the scrim comprises warp threads 28" which are laid adheringly upon the weft or filling threads 29" at 90° to each other. Again, registry of the fabricated material openings and the fibrous web openings may be obtained by a coordination of the scrim manufacturing means and the aperture pattern of the fiber rearranging drum or belt. Novel effects may be obtained by positioning the warp and filling threads of the scrim at other angles than 90° to each other or by positioning the warp and filling threads thereof at angles other than 0° and 90° to the machine direction. One such novel effect may be obtained by positioning the warp and filling threads at angles of 90° to each other but at angles of 45° to the machine direction whereby an unusual crisscross effect is obtained in the fibrous web openings. FIGURE 12 illustrates a cross-sectional view of the fabric of FIGURE 11 and shows the positioning of the nonwoven fibrous material on both sides of the scrim, with the rearranged fibers surrounding the threads in intermeshing and interengaging relation with each other and with the threads.

Figure 13:
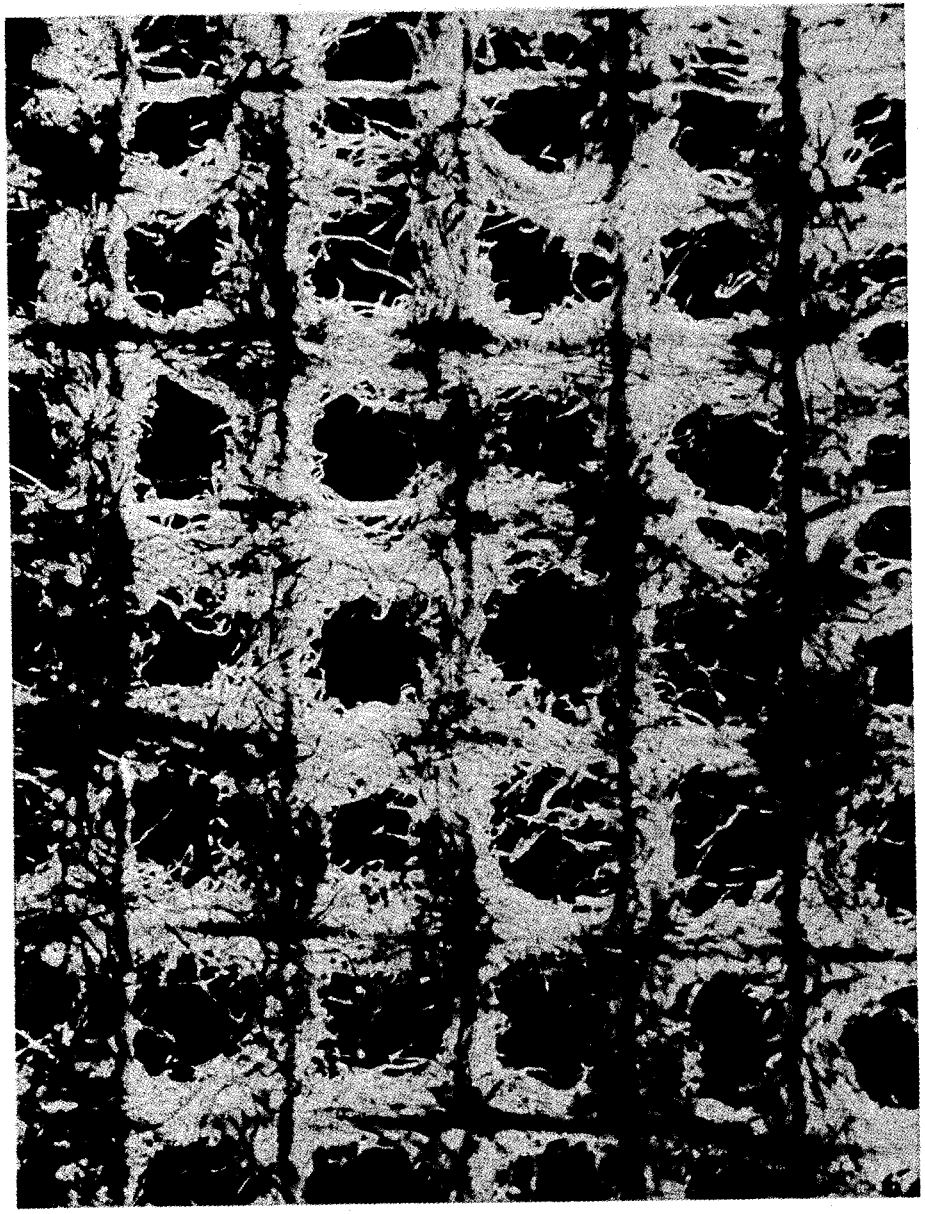
FIGURE 13 is a photomicrograph on an enlarged scale, approximately 20×, of a nonwoven fabric incorporating a woven fabric as a reinforcement made by the apparatus and method of the present invention.

FIGURE 13 is a photomicrograph on an enlarged scale, approximately 20×, clearly showing the rearranged fibers surrounding the threads in intermeshing and interengaging relation with each other and with the threads. It is to be noted that registry of openings is present in one direction (i.e., from left to right in FIGURE 13) but not in the other direction (i.e., vertically in FIGURE 13), at least in the upper portion of the photomicrograph.

The invention will be further illustrated in greater detail by the following specific examples. It should be understood, however, that although these examples may describe in particular detail some of the more specific features of the invention, they are given primarily for purposes of illustration and the invention in its broader aspects is not to be construed as limited thereto.

*Example 1*

A coherent reinforced nonwoven fabric is formed as follows:

The fibrous web is a loosely assembled 20-pound basis weight paper sheet made from unbeaten, sulfite pulp of spruce fibers (4–5 mm.). The supporting fabricated material is 14 × 10 unbleached cotton gauze of a plain weave of 30's warp and 40's filling yarns. The loosely assembled fibrous web and the gauze are brought together as illustrated in the apparatus in FIGURE 1, with the gauze next to the endless foraminous supporting belt and the fibrous web next to the rearranging drum. The lowermost conveyor is rendered inoperative and only one fibrous web is used. The pattern of apertures on the rotatable rearranging drum is 15 x 15 square pattern, 225 apertures per square inch, each aperture being circular and 0.045 inch in diameter. The fluid used for rearranging the fibers is water.

A reinforced nonwoven fabric is prepared in which there is no registry between the fabric openings in the rearranged fibrous web and the fabric openings in the gauze. There is, however, a very definite intertwining and intermeshing of the fibers around the yarns of the gauze, thus creating a very clear sheath effect. This re-forming of the short fibers around the matrix of the gauze creates a soft hand and feel in the gauze whereby the usual harshness associated with gauze is not present. The resulting fabric is soft and absorbent and is useful for catamenial purposes.

*Example II*

The procedures of Example I are followed substantially as set forth therein except that fibers of Douglas fir (Coast type, 5–6 mm. length) are used instead of the spruce fibers. The increased fiber length provides for a more desirable reinforced nonwoven fabric in which the wood fibers are more firmly intertwined and intermeshed with each other about and with the yarns of the gauze reinforcing material.

*Example III*

The procedures set forth in Example I are carried out substantially as set forth therein, except that the gauze is 15 x 15 and is so positioned that its fabric openings fall substantially in registry with the openings in the 15 x 15 apertured pattern of the rotatable rearranging drum. By carefully controlling the tension exerted on the gauze as it is fed through the rearranging apparatus, excellent registry of fabric openings and gauze openings is obtained. A portion of the resulting reinforced nonwoven fabric is illustrated in FIGURES 7 and 8.

*Example IV*

The procedures set forth in Example I are carried out substantially as set forth therein, except that the apparatus illustrated in FIGURE 2 is employed. The resulting reinforced nonwoven fabric made by this apparatus is very similar to that resulting from the use of the apparatus in FIGURE 1. The apertures in the rearranging belt are, of course, also a 15 x 15 square pattern and the principles involved are similar.

*Example V*

The procedures set forth in Example I are followed substantially as set forth therein, with the exception that the fibrous web is a carded web weighing 200 grains per square yard and comprises viscose rayon fibers having a length of 1⅛ inches and a denier of 1½ and the supporting fabricated material is a warp sheet of 30's cotton yarns. The warp sheet is approximately 36" wide and contains 540 threads. The resulting reinforced nonwoven fabric shows excellent strength in the long or machine direction. It is illustrated in FIGURES 5 and 6.

*Example VI*

The procedures set forth in Example V are followed substantially as set forth therein with the exception that the fibrous web comprises a blend of 50% by weight of the viscose rayon fibers used in Example V and 50% by weight of cotton having a staple length of about 1 inch (average). The resulting reinforced nonwoven fabric is soft and absorbent and has excellent hand and drape.

*Example VII*

The procedures set forth in Example I are followed substantially as set forth therein with the exception that the fibrous web comprises 100% by weight of cotton linters (average length about 4–5 mm.). The resulting reinforced nonwoven fabric is soft and absorbent and has excellent hand and drape.

*Example VIII*

The procedures set forth in Example I are followed substantially as set forth therein except that a 15 x 15 cotton scrim (30's warp and 40's filling) is used as the supporting fabricated material. The resulting reinforced nonwoven fabric is soft and absorbent and is illustrated in FIGURES 7 and 8.

*Example IX*

The procedures set forth in Example I are followed substantially as set forth therein with the exception that both conveyor belts are used and two fibrous webs of viscose rayon, 1⅛ inch length, 1½ denier, each web weighing 150 grains per square yard, are applied to the gauze. The fibers of each web intertwine and intermesh with each other about and with the yarns of the gauze and a coherent rearranged reinforced nonwoven fabric is obtained. It is soft and absorbent and has a good hand and drape.

*Example X*

The procedures set forth in Example I are followed substantially as set forth therein with the exception that the fibrous starting material comprises a wet-formed web of ⅜ inch, 1½ denier viscose rayon fibers made on a conventional papermaking machine. The resulting re-formed nonwoven fabric is similar to the product of Example I except that it is softer and more lint-free.

*Example XI*

The procedures set forth in Example I are followed substantially as set forth therein with the exception that the fibers used in making the fibrous web are nylon 6/6, ¼ inch in length and 3 denier. The resulting product is similar to the product of Example I.

*Example XII*

The procedures set forth in Example I are followed substantially as set forth therein with the exception that the starting material is a fibrous web formed by conventional air deposition techniques and comprises 1⅛ inches, 1½ denier viscose rayon fibers. The resulting product is similar to the product of Example I.

Although several specific examples of the inventive concept have been described, the same should not be construed as limited thereby nor to the specific details mentioned therein but to include various other equivalent constructions, as set forth in the claims appended hereto. It is understood that any suitable changes, modifications and variations may be made without departing from the spirit and scope of the invention.

What is claimed is:

1. A method of producing a coherent reinforced nonwoven fabric which comprises: superimposing in contacting relationship a layer of fibers which individually are capable of movement under the influence of an applied fluid force and a reinforcing fabricated material containing textile strands to form an assemblage, introducing the assemblage between flexible foraminous means and means defining longitudinally and transversely spaced apertures, with the opposite sides of said assemblage in contact one with the flexible means and the other with the spaced apertured means; and projecting a liquid with force through said apertured means and said assemblage, so that the liquid strikes said flexible foraminous means and provides a rearranging zone between the apertured means and the foraminous means, thus effecting movement of fibers in the said layer of fibers under the influence of the liquid force, thereby causing these fibers to intertwine with and about the textile strands of said fabricated material to form the said reinforced fabric.

2. A method of producing a coherent reinforced nonwoven fabric which comprises: superimposing in contacting relationship a layer of fibers which individually are capable of movement under the influence of an applied fluid force and a reinforcing fabricated warp sheet material containing textile strands to form an assemblage, introducing the assemblage between flexible foraminous means and means defining longitudinally and transversely spaced apertures, with the opposite sides of said assemblage in contact one with the flexible means and the other with the spaced apertured means; and projecting a liquid with force through said apertured means and said assemblage, so that the liquid strikes said flexible foraminous means and provides a rearranging zone between the apertured means and the foraminous means, thus effecting movement of fibers in the said layers of fibers under the influence of the liquid force, thereby causing these fibers to intertwine with and about the textile strands of said fabricated material to form the said reinforced fabric.

3. A method of producing a coherent reinforced nonwoven fabric which comprises: superimposing in contacting relationship a layer of fibers which individually are capable of movement under the influence of an applied fluid force and a reinforcing woven open-mesh material containing textile strands to form an assemblage, introducing the assemblage between flexible foraminous means and means defining longitudinally and transversely spaced apertures, with the opposite sides of said assemblage in contact one with the flexible means the other with the spaced apertured means; and projecting a liquid with force through said apertured means and said assemblage, so that the liquid strikes said flexible foraminous means and provides a rearranging zone between the apertured means and the foraminous means, thus effecting movement of fibers in the said layer of fibers under the influence of the liquid force, thereby causing these fibers to intertwine with and about the textile strands of said reinforcing material to form the said reinforced fabric.

4. A method of producing a coherent reinforced nonwoven fabric which comprises: superimposing in contacting relationship a layer of fibers which individually are capable of movement under the influence of an applied fluid force and a reinforcing scrim material containing textile strands to form an assemblage, introducing the assemblage between flexible foraminous means and means defining longitudinally and transversely spaced apertures, with the opposite sides of said assemblage in contact one with the flexible means and the other with the spaced apertured means; and projecting a liquid with force through said apertured means and said assemblage, so that the liquid strikes said flexible foraminous means and provides a rearranging zone between the apertured means and the foraminous means, thus effecting movement of fibers in the said layer of fibers under the influence of the liquid force, thereby causing these fibers to intertwine with and about the textile strands of said reinforcing material to form the said reinforced fabric.

5. A method of producing a coherent reinforced nonwoven fabric which comprises: introducing a fabricated reinforcing material containing textile strands between and in contacting relationship with fibrous webs the fibers of which individually are capable of movement under the influence of an applied fluid force to form a sandwich, introducing the said sandwich between flexible foraminous means and means defining longitudinally and transversely spaced apertures, with the opposite sides of said sandwich in contact one with the flexible means and the other with the spaced apertured means; and projecting a liquid with force through said apertured means and said sandwich, so that the liquid strikes said flexible foraminous means and provides a rearranging zone between the apertured means and the foraminous means, thus effecting movement of fibers in the said webs under the influence of the liquid force, thereby causing these fibers to intertwine with and about the textile strands of said fabricated material to form the said reinforced fabric.

References Cited in the file of this patent

UNITED STATES PATENTS

| | | |
|---|---|---|
| Re. 21,890 | Walsh et al. | Aug. 26, 1941 |
| 1,786,669 | Manning | Dec. 30, 1930 |
| 2,017,339 | Bryant et al. | Oct. 15, 1935 |
| 2,148,490 | Millspaugh | Feb. 28, 1939 |
| 2,218,338 | Manning | Oct. 15, 1940 |
| 2,774,127 | Secrist | Dec. 18, 1956 |
| 2,835,020 | Doe | May 20, 1958 |
| 2,862,251 | Kalwaites | Dec. 2, 1958 |